Dec. 8, 1959 W. G. DAVENPORT 2,916,134
RECIRCULATOR CONVEYOR
Filed July 22, 1954 3 Sheets-Sheet 1
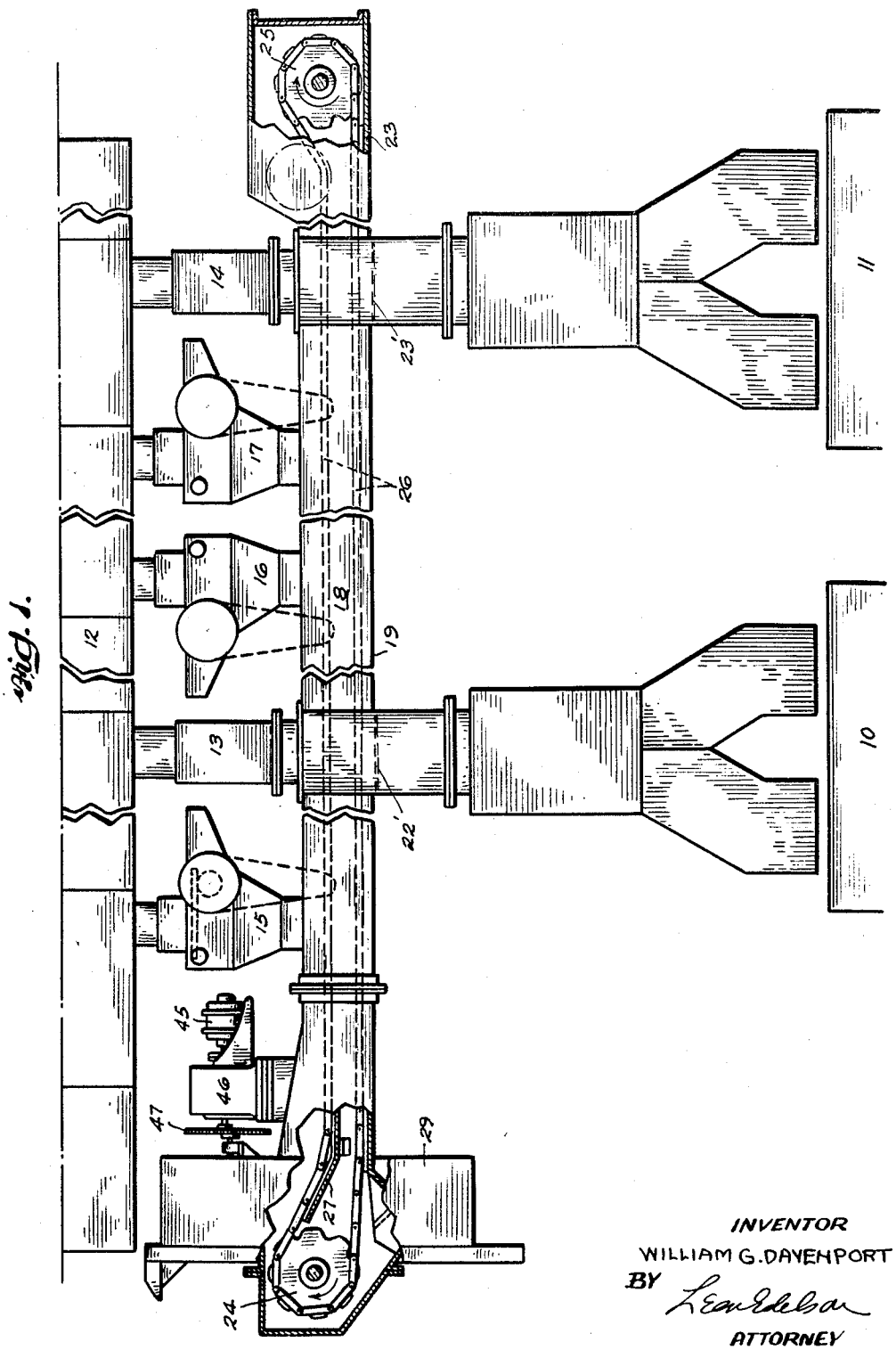
INVENTOR
WILLIAM G. DAVENPORT
BY
ATTORNEY Dec. 8, 1959 W. G. DAVENPORT 2,916,134
RECIRCULATOR CONVEYOR
Filed July 22, 1954 3 Sheets-Sheet 2
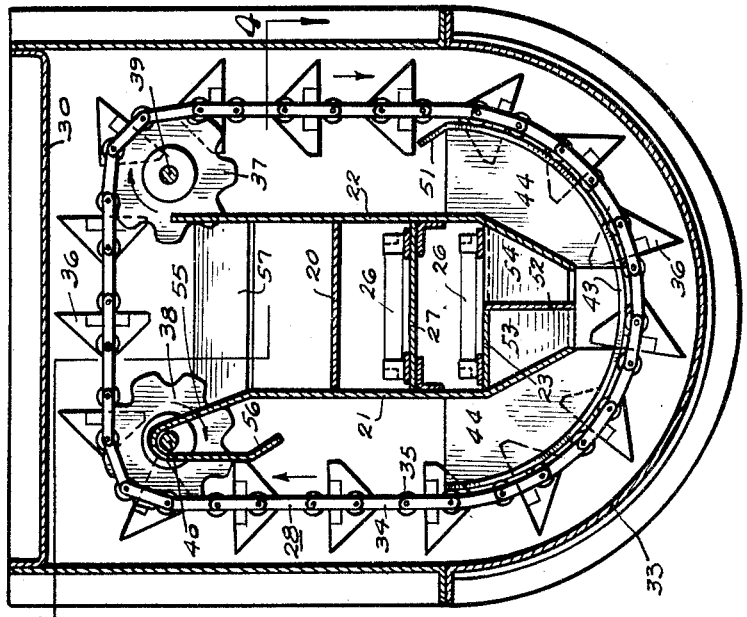
INVENTOR
WILLIAM G. DAVENPORT
BY [signature]
ATTORNEY

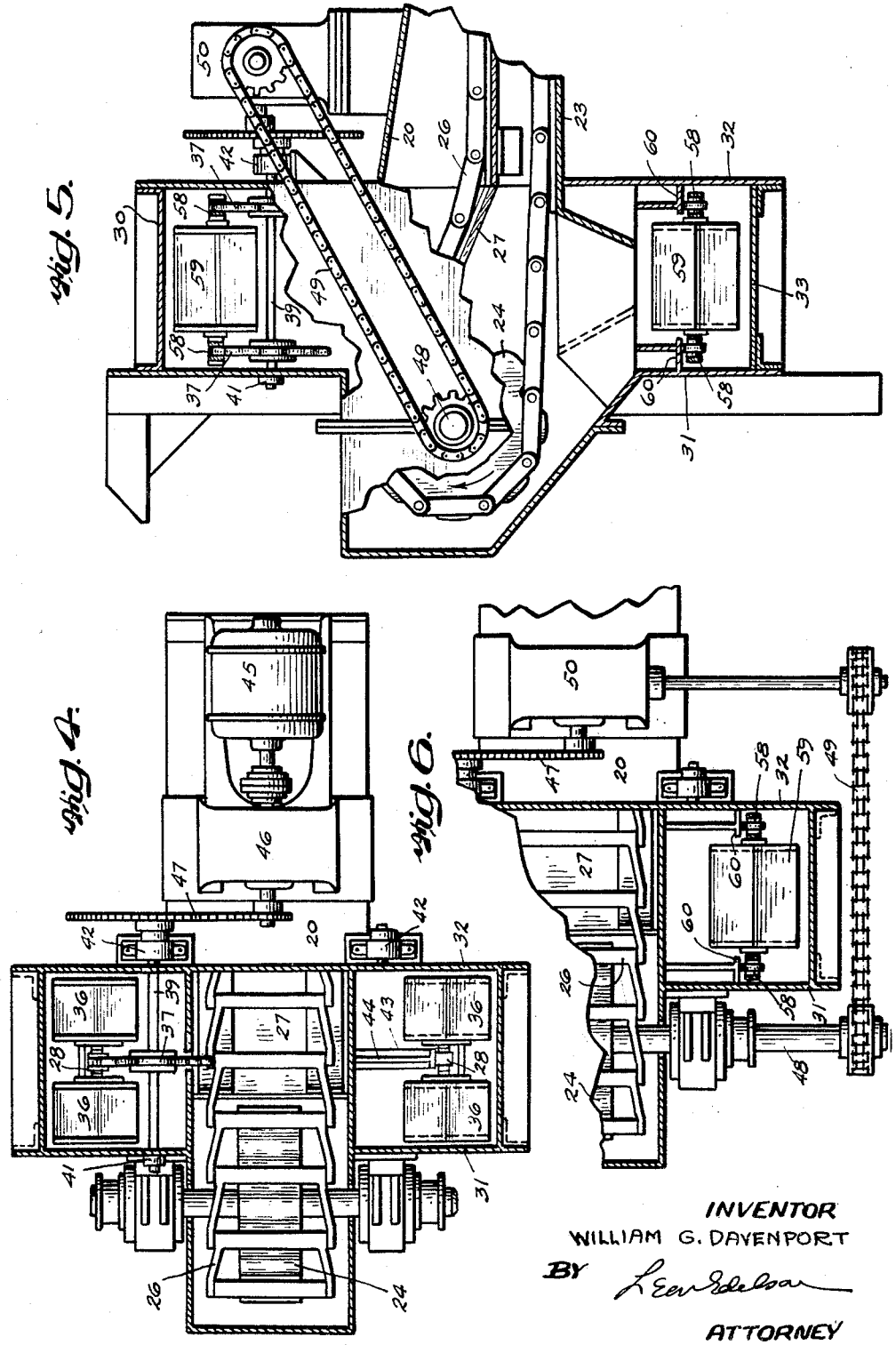

United States Patent Office 2,916,134
Patented Dec. 8, 1959

2,916,134

RECIRCULATOR CONVEYOR

William G. Davenport, Jenkintown, Pa., assignor to Beaumont Birch Company, Philadelphia, Pa., a corporation of Pennsylvania Application July 22, 1954, Serial No. 445,000

5 Claims. (Cl. 198—85)

This invention relates generally to material handling equipment and is concerned more particularly with improvements in auxiliary means for recirculating the droppings from primary conveyors for free-flowing bulk material such as coal.

Modern power plants usually are provided with a number of boiler units. If the latter burn coal, the plant is commonly provided additionally with a large capacity coal storage bunker which extends horizontally over the boiler units. For making all of the coal stored in the bunker available to any boiler unit, a primary conveyor, commonly referred to as an under-bunker conveyor, may be utilized. The underbunker conveyor is interposed between the bunker and boiler units and may be in the form of a horizontally extending endless chain conveyor. Coal discharged by gravity selectively through a series of gates in the bottom of the bunker is received by the upper run of the conveyor chain, which moves it to one end of the conveyor, where it is transferred to the lower run of the conveyor chain. The latter moves the coal in the opposite direction selectively to chutes that service the several boilers.

Some of the coal will be caught in the chain or rest upon it, as a consequence of which it is not discharged into the selected boiler servicing chute. Instead, it is carried to the end of the lower run, where it is dislodged and drops from the conveyor chain into means for recirculating the same. At the time it is decided to commence discharging into a selected boiler servicing chute, there may be some coal on the lower run which has already been carried over or beyond the selected chute. This carry-over coal is moved to the end of the lower run, where it drops into the recirculating means for recirculation with any other droppings, which in all can amount to eight or ten tons of coal per day. The droppings can be carted or trucked away, but a more practical course is to recirculate the same. This has been done by gathering the droppings and utilizing a screw conveyor to move them up an incline to discharge the same upon the upper run for recirculation. This arrangement has proved to be somewhat unsatisfactory for several reasons. For example, a piece of foreign material can easily jam a screw conveyor, a screw conveyor wears out quickly and an inclined screw conveyor requires too much space.

Having in mind the foregoing, it is among the principal objects of the present invention to provide improved, longer wearing auxiliary means for recirculating the droppings from a primary conveyor for free-flowing bulk materials such as coal.

Another object of the present invention is to provide such auxiliary means in the form of a continuous bucket conveyor disposed in close encircling relation to the primary conveyor, forming a compact unit that requires relatively little space for installation.

And another object of the present invention is to provide such a recirculator conveyor wherein the buckets are mounted on a link chain, the construction being rugged, yet sufficiently flexible to insure against the coal being jammed between the chain, buckets and casing.

Still another object of the present invention is to provide such a recirculator conveyor the buckets of which pass close under the primary conveyor to take up the droppings by dredging action and pass close over the top of the primary conveyor to deliver the droppings thereto, the coal being thus handled gently to insure against breakage and to minimize dust.

Other objects and advantages of the present invention will appear more fully hereinafter, it being understood that the invention consists substantially in the combination, construction, location and general arrangement of parts, all as described in detail in the following specification, as shown in the accompanying drawings and as fully pointed out in the appended claims.

In the accompanying drawings:

Figure 1 is an elevation of apparatus embodying the present invention;

Figure 2 is a vertical section through the recirculator conveyor showing one form thereof;

Figure 3 is a section on line 3—3 of Figure 2;

Figure 4 is a section on line 4—4 of Figure 3;

Figure 5 is the same as Figure 2 but shows a modified form of the recirculator conveyor and of the drive therefor; and Figure 6 is a horizontal section through the modified form of the recirculator conveyor shown in Figure 5.

Referring now to the drawings and more particularly to Figure 1, it will be observed that a pair of boiler units to be serviced are therein designated generally by the numerals 10 and 11, the fuel for the boilers being stored in a horizontally extending overhead coal bunker designated generally by the numeral 12. Any suitable material handling equipment operating in conjunction with the recirculating apparatus of the present invention may be interposed between the bunker 12 and the boilers 10 and 11. Preferably such equipment includes chute means 13 and 14 for gravity discharge of coal from the bunker 12 directly to the boilers 10 and 11 respectively, and gate means 15, 16 and 17 for gravity discharge of coal from the bunker 12 selectively to the boilers 10 and 11 through the medium of a horizontally extending under-bunker conveyor 18 and the gravity discharge chute means 13 and 14.

The under-bunker conveyor 18 is housed in a casing 19 having a top 20, opposite sides 21 and 22 and a bottom 23, the latter being provided with a pair of discharge gates 22' and 23' associated respectively with the chute means 13 and 14. A head sprocket 24 and a foot sprocket 25 are disposed respectively at the opposite ends of the conveyor 18. An endless chain 26 extends about head sprocket 24 and horizontally over a trough plate 27 to the foot sprocket 25, about the latter and back in the opposite direction over the casing bottom 23 to the head sprocket 24.

In the operation of the material handling equipment, coal from the bunker 12 may be fed into the boilers 10 and 11 through the gravity discharge chute means 13 and 14, which are operable to bypass the under-bunker conveyor 18. The gravity discharge gate means 15, 16 and 17 are operable to discharge coal upon the upper run of the chain 26. The latter moves the coal over trough plate 27 to the foot of the conveyor, where it is transferred to the lower run of the chain 26. The latter moves the coal in the opposite direction over the casing bottom 23, and as the coal approaches the head of the conveyor, it is discharged by gravity optionally through the gates 22' or 23' into the chute means 13 or 14, through which the coal then passes into the boilers.

Some of the coal will be caught in the chain 26 or rest upon it, as a consequence of which it is not discharged into the chute means 13 or 14. Instead, it is carried over the casing bottom 23 to the head of the conveyor, where it is dislodged and drops from the conveyor chain 26 into recirculating means which is to be described. Assuming that coal supplied to the lower run of the under-bunker conveyor is being discharged therefrom through chute means 13, the lower run normally is loaded with coal from the foot of the conveyor to the chute means 13. When discharge through the chute means 13 is discontinued and discharge through the chute means 14 is commenced, the coal which has already been carried beyond the chute means 14, i.e., the coal between the chute means 13 and 14 on the lower run of the conveyor, is moved to the head of the conveyor, where it, too, drops into the recirculating means to be described.

The construction and operation of the material handling equipment, hereinabove described only generally, is old and well known, and therefore a more detailed description of the same is believed to be unnecessary for a full understanding of the present invention. For recirculating the droppings from the under-bunker conveyor, the material handling equipment includes auxiliary means in the form of a recirculator conveyor disposed at the head of the under-bunker conveyor.

The recirculator conveyor comprises an endless chain 28 which is housed in a casing 29 having a top wall 30, opposite side walls 31 and 32 and opposite end walls which extend downwardly from the top wall to the upper extremities of a rounded bottom wall or boot 33. The chain 28 is conventionally provided with articulated links 34, rollers 35 and bucket attachment means 35'. In addition the chain 28 conventionally mounts a series of V-shaped buckets 36 arranged in two rows respectively on opposite sides of the chain 28.

The chain 28 is trained over a pair of similar sprockets 37 and 38 which are carried respectively by a pair of shafts 39 and 40, the opposite end portions of each of the latter being suitably provided with journals 41 and 42 carried respectively by the casing sides 31 and 32. The chain 28 depends from the sprockets 37 and 38 and extends around the under-bunker conveyor 18. For guiding the lower portion of the chain 28, the under-bunker conveyor casing 19 carries suitable means in the form of a curved roller-engaging flat bar 43 secured to the casing sides 21 and 22 by a pair of wing plates 44—44. The portion of the chain 28 extending between the sprockets 37 and 38 is positioned as close as practicable over the upper run of the under-bunker conveyor 18, and the sprockets 37 and 38 are disposed on opposite sides of the under-bunker conveyor 18, the horizontal spacing thereof being such that the vertically extending portions of the chain 28 are disposed relatively close respectively to the casing sides 21 and 22. The sides 21 and 22 are notched as at 44' to accommodate the sprockets 37 and 38. The lower portion of the chain 28 is disposed in underslung relation to the guide means 43 close under the under-bunker conveyor casing 19. In view of the foregoing, it will be apparent that the chain 28 is compactly arranged about the conveyor 18, within the casing 29. It will be noted also that the interior of the recirculator conveyor casing 29 is in free communication with the interior of the under-bunker conveyor casing 19 and that both casings conjointly provide a substantially closed, dust-tight housing for the two conveyors and the material handled thereby.

As is shown in Figures 1, 2 and 4, the recirculator conveyor may be driven at any suitable speed by a motor 45 through the medium of a speed reducer 46 and chain drive 47. If desired, however, the recirculator conveyor may also be driven at any suitable speed from the under-bunker conveyor head shaft 48 through the medium of chain drives 47 and 49 and the speed changer 50, as best shown in Figures 5 and 6.

In the operation of the recirculator conveyor, as the drive shaft 39 turns the sprocket 37, the articulated chain links 34, the rollers 35 and paired buckets 36—36, the latter being disposed respectively on opposite sides of the sprocket 37, successively pass around the sprocket 37 and downwardly to the flat-bar guide 43. The rollers 35 successively engage the guide 43, the latter being provided with an inwardly turned portion 51 to insure against jamming. The paired buckets 36—36, after passing around the guide 43, respectively on opposite sides thereof, in a semi-circle to the other side of the under-bunker conveyor, move upwardly to the sprocket 38, where they pass around the latter, respectively on opposite sides thereof. Then the paired buckets 36—36 move horizontally to the sprocket 37. At all times the open mouths of the buckets 36 lead and the closed ends trail.

The droppings from the casing bottom 23 of the under-bunker conveyor casing 19 are discharged by gravity into the casing bottom or loading boot 33 of the recirculator conveyor. For suitably distributing the same, the under-bunker conveyor casing 19 is provided with a divider plate 52 that is disposed in the vertical longitudinally extending median plane of the under-bunker conveyor casing 19 and that extends below the casing bottom 23 from one side of the recirculator conveyor casing 29 to the other. The casing bottom 23 extends only a short distance into the recirculator conveyor casing 29 and then on one side of the divider plate 52 the casing bottom 23 terminates, while on the other side of the divider plate 52 the casing bottom 23 turns downwardly to form an inclined portion 53. On the side of the divider plate 52 where the casing bottom 23 terminates without turning downwardly, an inclined plate 54 is provided. The plates 53 and 54 direct the droppings respectively toward opposite sides of the boot 33 where the same are taken up by the paired buckets 36—36 by dredging action and carried upwardly to the sprocket 38. As the pairs of buckets 36—36 successively move around the sprocket 38, they turn on one side and unload by gravity discharge over an apron 55, which extends over the shaft 40 and downwardly on both sides thereof, being provided on the outer side with an inwardly turned portion 56 for insuring against jamming of the buckets 36. The discharge from the buckets 36 is directed upon the upper run of the chain 26 over the trough plate 27. A baffle plate 57 may be employed to help direct the discharge as desired.

Referring particularly to Figures 5 and 6, in the modified form of the invention, the recirculator conveyor comprises two strands of conventional roller chain 58—58 which conventionally mount therebetween a series of V-shaped buckets 59 arranged in a single row. The roller chains 58—58 are each trained over a pair of sprockets 37—38 respectively carried by the shafts 39 and 40, and for guiding the roller chains 58—58 as they pass under the under-bunker conveyor 18, each chain is provided with a guide 60. As already indicated, this modified form of the recirculator conveyor may be driven directly by independent drive means, or from the head shaft of the under-bunker conveyor. It is believed that a more detailed description of the construction and operation of the modified form of the present invention is unnecessary for a full understanding of the present invention.

It will be understood, of course, that the present invention is susceptible of various changes and modifications which may be made from time to time without involving any departure from the general principles or real spirit thereof. For example, buckets as such are not essential. It would be possible to use plain flat flights instead. In addition, the chain upon which the buckets are mounted need not be roller chain. Plain link chain without rollers could be used. Indeed, it would be possible to do without the chain altogether and to substitute therefor an endless belt of any suitable material. Accordingly, it is intended to claim the same broadly, as well as specifically, as indicated in the appended claims.

What is claimed as new and useful is:

1. In combination, an endless primary conveyor for free-flowing bulk material operable for moving the material along an upper level to one end of said primary conveyor, transferring the material to a lower level and then moving the same along said lower level in the opposite direction, auxiliary conveyor means for transferring the material from said lower to said upper level for re-circulation thereof, said auxiliary means including a vertically disposed conveyor having a loading boot for receiving the material from said lower level and an endless chain and bucket assembly, said chain being provided with articulated links that carry said buckets and mount the same with their open mouths presenting constantly in the direction of movement of said chain, said chain being adapted for training over a pair of chain sprockets disposed respectively on opposite sides of said primary conveyor and for depending therefrom in closely encircling relation to said primary conveyor, and said buckets being arranged in two rows disposed respectively on opposite sides of said chain and being operable to take up the material from said loading boot by dredging action, and means operable for discharging the major portion of said material from said lower level of the primary conveyor, said discharge means being disposed intermediate said auxiliary means and the end of said primary conveyor at which the material is transferred from said upper to said lower level, any material carried by said primary conveyor beyond said discharge means being recirculated as aforesaid.

2. In a material handling system including an endless conveyor of the drag-scraper type driven by a pair of horizontally spaced sprockets, said conveyor having a top run and a bottom run resting on top and bottom plates, respectively, between said sprockets, means for supplying solid and sub-divided material to at least one position along said top run, means for transferring said material from the end of said top run to the adjacent portion of said bottom run, and means including at least one opening in said bottom run for providing at least one discharge for material from said bottom run, wherein particles of said material tend to adhere to said conveyor and to be dislodged therefrom only when said conveyor passes around one of said sprockets subsequent to the passage of said conveyor beyond the last discharge opening, the improvement which comprises a material return system including a re-circulator housing located below said one sprocket and in direct open communication therewith so as to receive particles of material from said conveyor as said conveyor is bent in traveling around said sprocket, an elevating means in said housing for lifting material deposited in said housing upwardly and onto the top run of said conveyor, and means within said housing for directing the material deposited therein onto said elevating means.

3. In a material handling system including an endless conveyor of the drag-scraper type driven by a pair of horizontally spaced sprockets, said conveyor having a top run and a bottom run resting on top and bottom plates, respectively, between said sprockets, means for supplying solid and sub-divided material to at least one position along said top run, means for transferring said material from the end of said top run to the adjacent portion of said bottom run, and means including at least one opening in said bottom run for providing at least one discharge for material from said bottom run, wherein particles of said material tend to adhere to said conveyor and to be dislodged therefrom only when said conveyor passes around one of said sprockets subsequent to the passage of said conveyor beyond the last discharge opening, the improvement which comprises a material return system including a re-circulator housing located below said one sprocket and in direct open communication therewith so as to receive particles of material from said conveyor as said conveyor is bent in traveling around said sprocket, an elevating means in said housing for lifting material deposited in said housing upwardly and onto the top run of said conveyor, said elevating means comprising an endless chain and bucket assembly vertically oriented in closely encircling relationship about said conveyor in the immediate region of said one sprocket, and chute means within said housing proximately underlying said one sprocket for directing the material deposited into said housing into the buckets of said elevating means.

4. In a material handling system as defined in claim 2 wherein said elevating means includes an endless chain and bucket assembly, the chain thereof being provided with articulated links that carry the buckets with their open mouths presenting in the direction of movement of said chain, said chain being trained over and suspended from a pair of chain sprockets disposed respectively on opposite sides of the conveyor whereby the chain is disposed in closely encircling relation to said conveyor, and said buckets being arranged in two rows disposed respectively on opposite sides of said chain.

5. In a material handling system as defined in claim 2 wherein said elevating means includes an endless chain and bucket assembly, the chain thereof being provided with articulated links that carry the buckets with their open mouths presenting in the direction of movement of said chain, said chain being arranged in two strands each trained over and suspended from a pair of chain sprockets disposed respectively on opposite sides of the conveyor whereby the chain is disposed in closely encircling relation to said conveyor, and said buckets being arranged in a single row between the two strands of the chain.

References Cited in the file of this patent

UNITED STATES PATENTS

| | | |
|---|---|---|
| 587,509 | Roberts | Aug. 3, 1897 |
| 1,437,415 | Hauter | Dec. 5, 1922 |
| 2,522,449 | Inman | Sept. 12, 1950 |
| 2,563,321 | Dugan | Aug. 7, 1951 |
| 2,626,719 | Stock | Jan. 27, 1953 |
| 2,674,381 | Cady | Apr. 6, 1954 |
| 2,853,178 | Stock | Sept. 23, 1958 |

FOREIGN PATENTS

| | | |
|---|---|---|
| 629,844 | Germany | May 14, 1936 |